United States Patent
Wang et al.

(10) Patent No.: US 12,411,522 B2
(45) Date of Patent: Sep. 9, 2025

(54) FLEXIBLE DISPLAY SCREEN AND METHOD FOR ASSEMBLING THE SAME, AND ELECTRONIC APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yaming Wang, Beijing (CN); Liqiang Chen, Beijing (CN); Jiafan Shi, Beijing (CN); Pinfan Wang, Beijing (CN); Jia Zhao, Beijing (CN); Mengyuan Pang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 375 days.

(21) Appl. No.: 17/785,113

(22) PCT Filed: Jun. 9, 2021

(86) PCT No.: PCT/CN2021/099220
§ 371 (c)(1),
(2) Date: Jun. 14, 2022

(87) PCT Pub. No.: WO2021/249442
PCT Pub. Date: Dec. 16, 2021

(65) Prior Publication Data
US 2023/0026482 A1   Jan. 26, 2023

(30) Foreign Application Priority Data
Jun. 10, 2020 (CN) .......................... 202010522838.2

(51) Int. Cl.
*G06F 1/16* (2006.01)
*G06F 1/26* (2006.01)

(52) U.S. Cl.
CPC .............. *G06F 1/1652* (2013.01); *G06F 1/26* (2013.01)

(58) Field of Classification Search
CPC ........ G06F 1/1652; G06F 1/26; G06F 1/1637; G09F 9/301
See application file for complete search history.

(56) References Cited

U.S. PATENT DOCUMENTS 9,441,828 B2 * 9/2016 Wu ...................... F21V 33/0052
10,903,299 B2 * 1/2021 Shim ..................... G06F 1/1601
(Continued)

FOREIGN PATENT DOCUMENTS

CN 105492991 A 4/2016
CN 108108062 A 6/2018
(Continued)

OTHER PUBLICATIONS

Office Action for the Chinese Patent Application No. 202010522838.2 issued by the Chinese Patent Office on Aug. 27, 2021.
(Continued)

*Primary Examiner* — Imani N Hayman
*Assistant Examiner* — Theron S Milliser
(74) *Attorney, Agent, or Firm* — XSENSUS LLP

(57) ABSTRACT

A flexible display screen includes a main display portion, a first bending portion, a second bending portion and a corner bending portion. The main display portion includes a first side, an arc-shaped side and a second side that are connected in sequence. The first bending portion is located on a side of the main display portion where the first side is located, and is connected to the first side. The second bending portion is located on a side of the main display portion where the
(Continued)

second side is located, and is connected to the second side. The corner bending portion is located on a side of the main display portion where the arc-shaped side is located, and is connected to the arc-shaped side. A plurality of openings are disposed in the corner bending portion, and face a bending direction of the corner bending portion.

19 Claims, 16 Drawing Sheets

(56) References Cited

U.S. PATENT DOCUMENTS

| | | | |
|---|---|---|---|
| 10,939,547 B2* | 3/2021 | Lee | H05K 1/0313 |
| 10,990,133 B2* | 4/2021 | Nakatogawa | G09G 3/3266 |
| 11,528,812 B2* | 12/2022 | Ahn | G09F 9/302 |
| 11,528,813 B2* | 12/2022 | Jeong | G06F 1/1637 |
| 11,599,213 B2* | 3/2023 | Joo | G06F 3/0446 |
| 11,659,742 B2* | 5/2023 | Won | H10K 59/1213 257/72 |
| 11,678,509 B2* | 6/2023 | Hyun | G06F 1/1626 257/40 |
| 11,806,974 B2* | 11/2023 | Cao | B32B 3/30 |
| 11,825,684 B2* | 11/2023 | Park | H10K 59/8791 |
| 11,922,843 B2* | 3/2024 | Wang | G06F 1/1637 |
| 11,968,789 B2* | 4/2024 | Ahn | G06F 1/1637 |
| 11,977,417 B2* | 5/2024 | Park | G06F 1/1637 |
| 12,019,819 B2* | 6/2024 | Joo | G06F 3/0412 |
| 2014/0218971 A1* | 8/2014 | Wu | F21V 33/0052 362/613 |
| 2016/0021226 A1 | 1/2016 | Allore et al. | |
| 2019/0081127 A1* | 3/2019 | Shim | H10K 77/111 |
| 2019/0269011 A1* | 8/2019 | Lee | H05K 3/0014 |
| 2020/0142449 A1* | 5/2020 | Nakatogawa | H05B 33/02 |
| 2020/0170126 A1* | 5/2020 | Ahn | G09F 9/33 |
| 2020/0176696 A1 | 6/2020 | Dai | |
| 2020/0221588 A1* | 7/2020 | Jeong | H05K 5/0017 |
| 2021/0153363 A1 | 5/2021 | Cao et al. | |
| 2021/0165454 A1 | 6/2021 | Dong et al. | |
| 2021/0234120 A1 | 7/2021 | Zhang et al. | |
| 2021/0318770 A1* | 10/2021 | Joo | G06F 3/04164 |
| 2021/0376038 A1* | 12/2021 | Won | H10K 77/111 |
| 2021/0384465 A1* | 12/2021 | Park | H10K 50/844 |
| 2022/0080697 A1* | 3/2022 | Cao | B32B 3/02 |
| 2022/0123256 A1* | 4/2022 | Hyun | H10K 50/844 |
| 2023/0029926 A1* | 2/2023 | Park | G06F 1/1656 |
| 2023/0106694 A1* | 4/2023 | Ahn | G06F 1/1637 361/807 |
| 2023/0111683 A1* | 4/2023 | Wang | G06F 1/1652 345/55 |
| 2023/0205347 A1* | 6/2023 | Joo | G06F 3/0446 345/173 |
| 2024/0040826 A1* | 2/2024 | Park | H10K 59/12 |
| 2024/0153419 A1* | 5/2024 | Wang | G09G 3/035 |
| 2024/0206080 A1* | 6/2024 | Ahn | H05K 5/0017 |

FOREIGN PATENT DOCUMENTS

| | | |
|---|---|---|
| CN | 108615463 A | 10/2018 |
| CN | 108667960 A | 10/2018 |
| CN | 108766977 A | 11/2018 |
| CN | 109032251 A | 12/2018 |
| CN | 110010013 A | 7/2019 |
| CN | 110518039 A | 11/2019 |
| CN | 110767096 A | 2/2020 |
| CN | 110943114 A | 3/2020 |
| CN | 110992828 A | 4/2020 |
| CN | 110992831 A | 4/2020 |
| CN | 111681547 A | 9/2020 |

OTHER PUBLICATIONS

Notification to Grant Patent Right for Invention for the Chinese Patent Application No. 202010522838.2 issued by the Chinese Patent Office on Feb. 9, 2022.

* cited by examiner

FLEXIBLE DISPLAY SCREEN AND METHOD FOR ASSEMBLING THE SAME, AND ELECTRONIC APPARATUS

CROSS-REFERENCE TO RELATED APPLICATIONS

This application is a national phase entry under 35 USC 371 of International Patent Application No. PCT/CN 2021/099220 filed on Jun. 9, 2021, which claims priority to Chinese Patent Application No. 202010522838.2, filed on Jun. 10, 2020, titled "FLEXIBLE DISPLAY SCREEN AND METHOD FOR ASSEMBLING THE SAME, AND ELECTRONIC APPARATUS", which are incorporated herein by reference in their entirety.

TECHNICAL FIELD

The present disclosure relates to the technical field of electronic apparatuses, and in particular, to a flexible display screen and a method for assembling the same, and an electronic apparatus.

BACKGROUND

With the rapid development of display technologies, trends of beauty, lightness and thinness of an electronic product gradually emerge, and an attaching of a curved surface of a flexible display screen is rapidly developed.

With the gradual maturity of a curved attaching process in two sides of the flexible display screen, a curved attaching process in four sides of the flexible display screen has gradually begun to develop. However, in the curved attaching process in the four sides of the flexible display screen, it is difficult to realize a corner attaching of the flexible display screen. Especially with an increase of a depth of a corner arc-shaped region, which is attached to a forming die, of the flexible display screen, the flexible display screen is stressed increasingly complicatedly.

SUMMARY

In an aspect, a flexible display screen is provided. The flexible display screen includes a main display portion, a first bending portion, a second bending portion and a corner bending portion.

The main display portion includes a first side, an arc-shaped side and a second side that are connected in sequence. The first bending portion is located on a side of the main display portion where the first side is located, and is connected to the first side. The second bending portion is located on a side of the main display portion where the second side is located, and is connected to the second side. The corner bending portion is located on a side of the main display portion where the arc-shaped side is located, and is connected to the arc-shaped side.

The first bending portion, the corner bending portion and the second bending portion are connected in sequence, and constitute a display region together with the main display portion. A plurality of openings are disposed in the corner bending portion, and face a bending direction of the corner bending portion.

In some embodiments, the corner bending portion has a wiring region and a deformation region that are sequentially disposed along a direction from the corner bending portion toward the main display portion. The deformation region is connected to the arc-shaped side, and the plurality of openings are disposed in the deformation region. At least one first signal line is disposed in the wiring region.

In some embodiments, the plurality of openings are arranged in a plurality of rows in a radial direction of the arc-shaped side, and openings in each row are arranged at intervals along an extending direction of the arc-shaped side.

In some embodiments, along a direction from a center of the deformation region toward the first bending portion and along a direction from the center of the deformation region toward the second bending portion, dimensions of openings in each of at least one row along the radial direction of the arc-shaped side are reduced in sequence; and/or dimensions of openings in each of at least one row along the extending direction of the arc-shaped side are reduced in sequence.

In some embodiments, along a direction from a center of the deformation region toward a side boundary of the deformation region along the radial direction of the arc-shaped side and along a direction from the center of the deformation region toward another side boundary of the deformation region along the radial direction of the arc-shaped side, dimensions, along the radial direction of the arc-shaped side, of openings arranged along the radial direction of the arc-shaped side are reduced in sequence; and/or dimensions, along the extending direction of the arc-shaped side, of openings arranged along the radial direction of the arc-shaped side are reduced in sequence.

In some embodiments, the deformation region includes a middle region and an edge region, and the edge region surrounds the middle region. A dimension, along the radial direction of the arc-shaped side, of an opening in the plurality of openings located in the middle region is greater than a dimension, along the radial direction of the arc-shaped side, of an opening in the plurality of openings located in the edge region; and/or a dimension, along the extending direction of the arc-shaped side, of an opening in the plurality of openings located in the middle region is greater than a dimension, along the extending direction of the arc-shaped side, of an opening in the plurality of openings located in the edge region.

In some embodiments, dimensions, along the radial direction of the arc-shaped side, of openings in the plurality of openings located in the middle region are substantially same; and/or dimensions, along the radial direction of the arc-shaped side, of openings in the plurality of openings located in the edge region are substantially same.

In some embodiments, a dimension of the deformation region along the radial direction of the arc-shaped side is L1, and a minimum distance, along the radial direction of the arc-shaped side, between a boundary of the middle region and a boundary of the deformation region that are close to each other is in a range of ¼ L1 to ⅓ L1; and/or a dimension of the deformation region along the extending direction of the arc-shaped side is L2, and a distance, along the extending direction of the arc-shaped side, between a boundary of the middle region and a boundary of the deformation region that are close to each other is in a range of ⅙ L2 to ⅕ L2.

In some embodiments, along a direction from a center of the deformation region toward the first bending portion and along a direction from the center of the deformation region toward the second bending portion, distances, each of which is a distance between two adjacent openings in openings 4 in each of at least one row, are increased in sequence; and/or along a direction from a center of the deformation region toward a side boundary of the deformation region along the radial direction of the arc-shaped side and along a direction from the center of the deformation region toward another side boundary of the deformation region along the radial direction of the arc-shaped side, distances, each of which is a distance between two adjacent openings in openings arranged along the radial direction of the arc-shaped side, are increased in sequence.

In some embodiments, an opening in the plurality of openings has a strip shape, and a length extending direction of the opening is substantially same as an extending direction of the arc-shaped side; and/or a length extending direction of the opening is substantially tangent to an extending direction of the arc-shaped side.

In some embodiments, the plurality of openings are divided into a plurality of groups that are arranged in a plurality of rows along a radial direction of the arc-shaped side, and groups of openings in each row are arranged at intervals along an extending direction of the arc-shaped side or a tangential direction of the arc-shaped side. A distance between two adjacent openings in each group of openings is less than a distance between two openings that are closest to each other in two adjacent groups of openings.

In some embodiments, an opening in the plurality of openings has a circular shape, an elliptical shape, or a polygonal shape.

In some embodiments, an opening in the plurality of openings is a through hole penetrating through the corner bending portion along a thickness direction of the corner bending portion; or an opening in the plurality of openings is a groove recessed along a thickness direction of the corner bending portion.

In some embodiments, the corner bending portion includes a plurality of sub-pixels. Two adjacent openings are provided with at least one sub-pixel therebetween; or the plurality of openings are divided into a plurality of groups, and two adjacent groups of openings are provided with at least one sub-pixel therebetween.

In some embodiments, the corner bending portion has a wiring region and a deformation region. The plurality of openings are disposed in the deformation region, and at least one first signal line is disposed in the wiring region. The corner bending portion further includes a plurality of second signal lines. Each sub-pixel is electrically connected to at least one second signal line. The plurality of second signal lines extend in gaps between the plurality of openings, and each second signal line is electrically connected to a first signal line in the at least one first signal line.

In another aspect, a method for assembling a flexible display screen is provided. The flexible display screen is the flexible display screen in any one of the above embodiments. The assembling method includes: connecting a side of the first bending portion, a side of the second bending portion, and a side of the corner bending portion that are away from the main display portion to respective carrier films; attaching the flexible display screen to a forming die, at least part of each of the carrier films protruding from a boundary of the forming die; and pulling the carrier films to attach the flexible display screen to the forming die.

In some embodiments, a carrier film connected to the corner bending portion of the flexible display screen is provided with a plurality of slits arranged at intervals, and the plurality of slits are arranged at intervals along an extending direction of the arc-shaped side of the main display portion of the flexible display screen. Each slit extends along a radial direction of the arc-shaped side, and an end of each slit extends to a side of the carrier film connected to the corner bending portion.

In yet another aspect, an electronic apparatus is provided. The electronic apparatus includes the flexible display screen in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

DETAILED DESCRIPTION

Figure 1:
FIG. 1 is a structural diagram of an electronic apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "an example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The phrase "A and/or B" includes following three combinations: only A, only B, and a combination of A and B.

The term such as "about," "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In the description of the present disclosure, it will be understood that orientations or positional relationships indicated by the terms such as "center," "longitudinal," "lateral," "length," "width," "vertical," "horizontal," "inner" and "outer" are based on orientations or positional relationships shown in the drawings, which are merely to facilitate the description of the present disclosure and simplify the description, and are not to indicate or imply that the indicated devices or elements must have particular orientations, or must be constructed or operated in particular orientations, and thus cannot be construed as limitations on the present disclosure.

In addition, a feature defined with "first" or "second" may explicitly or implicitly include one or more of the features. In the description of the embodiments of the present disclosure, the term "a plurality of/the plurality of" means two or more unless otherwise specified.

In the description of the present disclosure, it will be noted that the terms such as "installed," "joined" and "connected" shall be construed broadly, unless otherwise explicitly stated or limited. For example, the term "connected" may be fixedly connected, detachably connected, or integrally connected; the term "connected" may be mechanically connected or electrically connected; the term "connected" may be directly connected, indirectly connected through an intermediate medium, or internally communicated between two elements. Specific meanings of the above terms in the present disclosure may be understood as appropriate by a person of ordinary skill in the art.

As shown in FIG. 1, some embodiments of the present disclosure provide an electronic apparatus. The electronic apparatus 101 may be a television, a mobile phone, a computer, a notebook computer, a tablet computer, a personal digital assistant (PDA), or a vehicle-mounted computer.

The electronic apparatus 101 includes a display panel. The display panel may be a liquid crystal display (LCD) panel. Alternatively, the display panel may be an electroluminescent display panel or a photoluminescent display panel. In a case where the display panel is the electroluminescent display panel, the electroluminescent display panel may be an organic light-emitting diode (OLED) display panel or a quantum dot light-emitting diode (QLED) display panel. In a case where the display panel is the photoluminescent display panel, the photoluminescent display panel may be a quantum dot photoluminescent display panel.

The display panel includes a flexible display screen 102 and a forming die 103. In order to obtain a curved electronic apparatus, the flexible display screen 102 of the display panel is usually arranged to be curved and attached to the forming die 103. For example, an edge of the forming die 103 is processed to have a curved surface, and in a process of attaching the flexible display screen 102 to the forming die 103, an edge of the flexible display screen 102 is curved and attached to the forming die 103.

Figure 2:
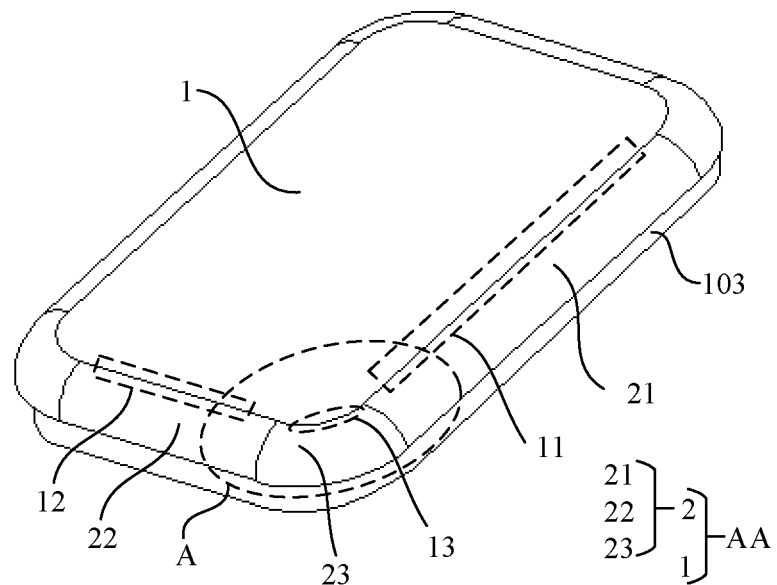
FIG. 2 is a structural diagram of a flexible display screen, in accordance with some embodiments.

As shown in FIG. 1, the flexible display screen 102 includes a main display portion 1 and an edge display portion 2. The edge display portion 2 is arranged around an edge of the main display portion 1, and is fixedly connected to the main display portion 1 or integrally formed with the main display portion 1. As shown in FIG. 2, the edge display portion 2 is curved toward the forming die 103, and is attached to the forming die 103.

In embodiments, the main display portion 1 may be located in the same plane. That is, the main display portion 1 has a planar structure. Of course, the main display portion 1 may be an arc-shaped display portion. That is, heights of two opposite ends of the main display portion 1 are slightly less than a height of the middle of the main display portion 1. The main display portion 1 includes a first side 11 and a second side 12 that are adjacent to each other. The first side 11 is connected to the second side 12 through an arc-shaped side 13, so that an outer contour of the main display portion 1 may be smooth.

As shown in FIG. 2, the edge display portion 2 includes a first bending portion 21, a second bending portion 22 and a corner bending portion 23. The first bending portion 21, the corner bending portion 23 and the second bending portion 22 are connected in sequence. The first bending portion 21 is located on a side of the main display portion 1 where the first side 11 is located, and is connected to the first side 11. The second bending portion 22 is located on a side of the main display portion 1 where the second side 12 is located, and is connected to the second side 12. The corner bending portion 23 is located on a side of the main display portion 1 where the arc-shaped side 13 is located, and is connected to the arc-shaped side 13.

In some embodiments, a side of the first bending portion 21 is connected to the first side 11, and after the first bending portion 21 is attached to the forming die 103, the first bending portion 21 and the main display portion 1 may form an included angle therebetween. A side of the second bending portion 22 is connected to the second side 12, and after the second bending portion 22 is attached to the forming die 103, the second bending portion 22 and the main display portion 1 may form an included angle therebetween. A side of the corner bending portion 23 is connected to the arc-shaped side 13, and after the corner bending portion 23 is attached to the forming die 103, the corner bending portion 23 and the main display portion 1 may form an included angle therebetween.

After the flexible display screen 102 is attached to the forming die 103, the first bending portion 21, the second bending portion 22 and the corner bending portion 23 have the same bending direction B. The first bending portion 21, the corner bending portion 23 and the second bending portion 22 are connected in sequence, and constitute a display region AA together with the main display portion 1. The flexible display screen 102 with a curved edge has a large display area, and the edge is smooth.

In some embodiments, the first side 11 and the second side 12 are straight sides, so that the structure of the flexible display screen 102 may be simplified, and the flexible display screen 102 and the forming die 103 may be attached conveniently.

In some embodiments, the main display portion 1 includes first sides 11 and second sides 12, and any two adjacent sides respectively a first side 11 and a second side 12, and are connected through an arc-shaped side 13. Each arc-shaped side 13 is connected to a corner bending portion 23, each first side 11 is connected to a first bending portion 21, and each second side 12 is connected to a second bending portion 22. A plurality of corner bending portions 23, first bending portions 21 and second bending portions 22 are connected, and constitute the display region AA of the flexible display screen 102 together with the main display portion 1. That is, the corner bending portions 23, the first bending portions 21 and the second bending portions 22 are each provided with pixels to realize a display function.

Figure 3:
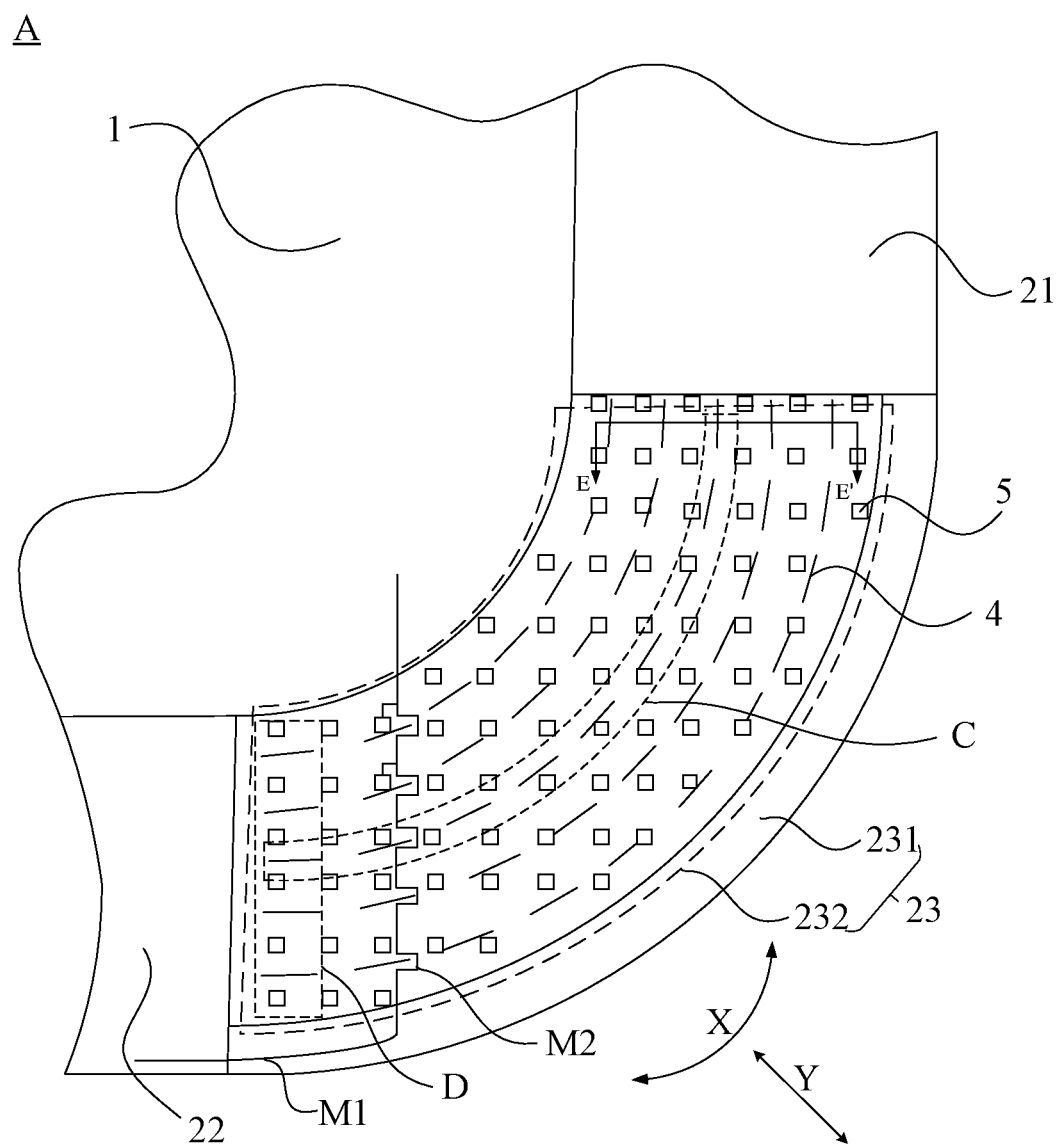
FIG. 3 is a structural diagram corresponding to the A region in FIG. 2.

For the flexible display screen 102 and the forming die 103 in the attaching process of the flexible display screen 102, a corner of the forming die 103 generally has a spherical-like surface, so that the flexible display screen 102 is subjected to a large tensile stress along a radial direction (i.e., a radial direction of the arc-shaped side 13, Y direction as shown in FIG. 3) and a large tensile stress along a lateral direction (i.e., an extending direction of the arc-shaped side 13, X direction as shown in FIG. 3) at the middle of the corner. Therefore, the middle of the corner bending portion 23 generates a larger tensile stress than the first bending portion 21 or the second bending portion 22, which is more likely to cause cracks, wrinkles or attachment cracking, resulting in a damage to the screen.

As shown in FIG. 3, in some embodiments, a plurality of openings 4 are provided in the corner bending portion, and the plurality of openings 4 face the bending direction B of the corner bending portion. In a bending process of the corner bending portion 23, the tensile stress to which the corner bending portion 23 is subjected is partially absorbed by deformation of the openings 4, so as to reduce a risk of cracking and wrinkling of the corner bending portion 23.

As shown in FIG. 3, in exemplary embodiments, the corner bending portion 23 has a wiring region 231 and a deformation region 232. The deformation region 232 is close to the main display portion 1, and is connected to the main display portion 1. The wiring region 231 is located on a side of the deformation region 232 away from the main display portion 1.

The wiring region is used for arranging one or more of some components, pixel circuits and signal line(s).

For example, as shown in FIG. 3, the wiring region is provided with first signal line(s) M1 therein.

The wiring region 231 is provided with at least two first signal line M1 therein.

The first signal line M1 may be, for example, a data line for transmitting a gray-scale data signal to a pixel, or a supply voltage signal line.

In some embodiments, the deformation region 232 is provided with the plurality of openings 4 therein. The tensile stress to which the corner bending portion 23 is subjected is partially absorbed by the deformation of the openings 4, which reduces the risk of cracking and wrinkling of the corner bending portion 23, and reduces a stress strength of the wiring region 231, thereby protecting structures such as the components and the pixel circuits in the wiring region 231.

It will be understood that the wiring region 231 is not provided with an opening 4, which improves a strength of the wiring region 231, and makes the wiring region 231 difficult to deform relative to the deformation region 232, so that the signal line(s) in the wiring region 231 are protected to reduce a risk of cracking.

In some embodiments, adjacent openings 4 are provided with at least one sub-pixel 5 there between. Moreover, gaps between adjacent openings 4 may be used for arranging signal lines to realize the display function.

The openings 4 may be reasonably distributed according to distances between adjacent sub-pixels 5.

In embodiments, the corner bending portion 23 further includes a plurality of second signal lines M2.

In embodiments, in a case where the corner bending portion 23 has the wiring region 231 and the deformation region 232, the second signal lines M2 are disposed in the deformation region 232.

Each sub-pixel 5 is electrically connected to at least one second signal line M2.

The plurality of second signal lines M2 extend in gaps between openings 4, and each second signal line M2 is electrically connected to a first signal line M1.

The second signal line M2 may be electrically connected to at least one sub-pixel 5. The second signal line M2 may be, for example, a data line for transmitting a gray-scale data signal to a pixel, or a supply voltage signal line.

The second signal line M2 may be arranged into a polygonal line or a curved line to enhance stretchability.

In some embodiments, as shown in FIG. 3, the plurality of openings 4 are arranged in a plurality of rows along the radial direction (i.e., the Y direction) of the arc-shaped side 13, and openings 4 in each row are arranged at intervals along the extending direction (i.e., the X direction) of the arc-shaped side 13. Thus, when the flexible display screen 102 is attached to the forming die 103, the stress and strain may be better absorbed, the problem of the attachment cracking of the flexible display screen 102 may be better solved, and light-emitting devices and pixel circuits in a region without openings 4 may be better protected.

Figure 4:
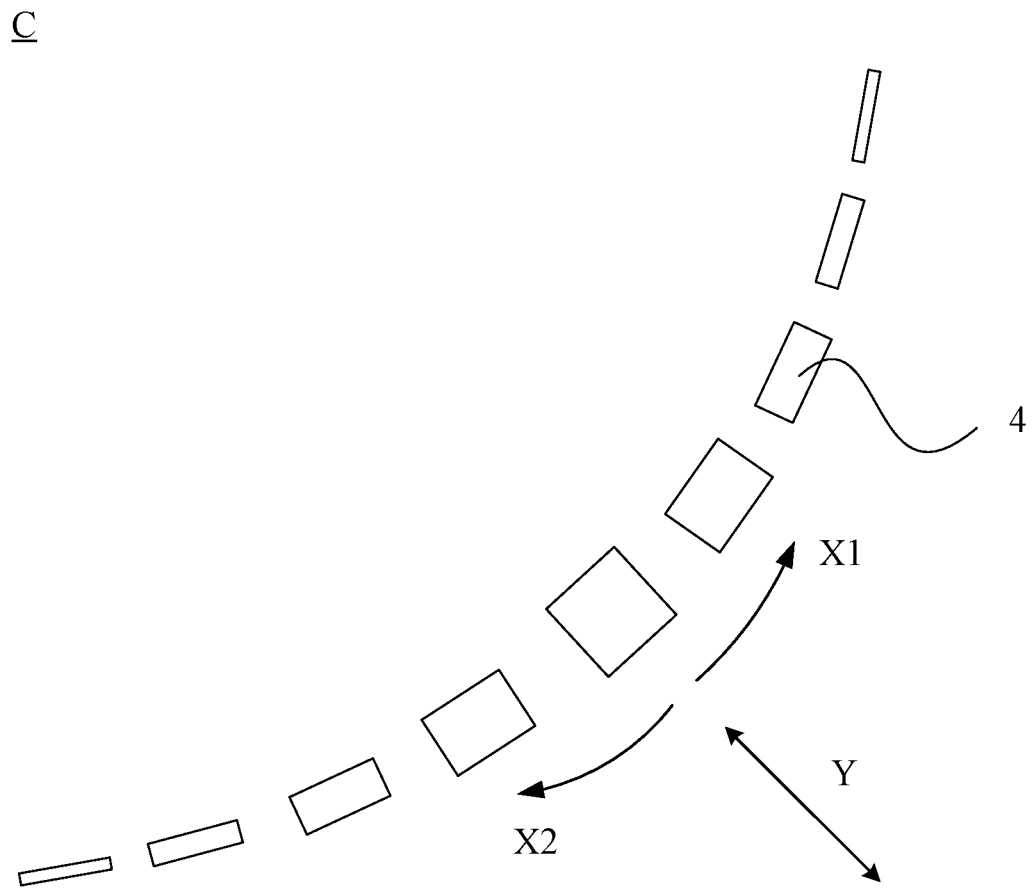
FIG. 4 is a structural diagram corresponding to the C region in FIG. 3.

In exemplary embodiments, as shown in FIG. 4, along a direction (i.e., X1 direction) from a center of the deformation region 232 toward the first bending portion 21 and along a direction (i.e., X2 direction) from the center of the deformation region 232 toward the second bending portion 22, dimensions of openings 4 in each of at least one row along the radial direction (i.e., Y direction) of the arc-shaped side 13 are gradually reduced. After the corner bending portion 23 is curved and attached to the forming die 103, a center of a region where openings 4 in a row are located is stressed more than two ends of the region. Therefore, dimensions of the openings 4 in this row along the radial direction of the arc-shaped side 13 are gradually reduced from the center to the two ends, so that the center of the region where the openings 4 in this row are located absorbs more stress. Thus, the region where the openings 4 in this row are located is uniformly stressed along the radial direction of the arc-shaped side 13 after the attaching.

Figure 5:
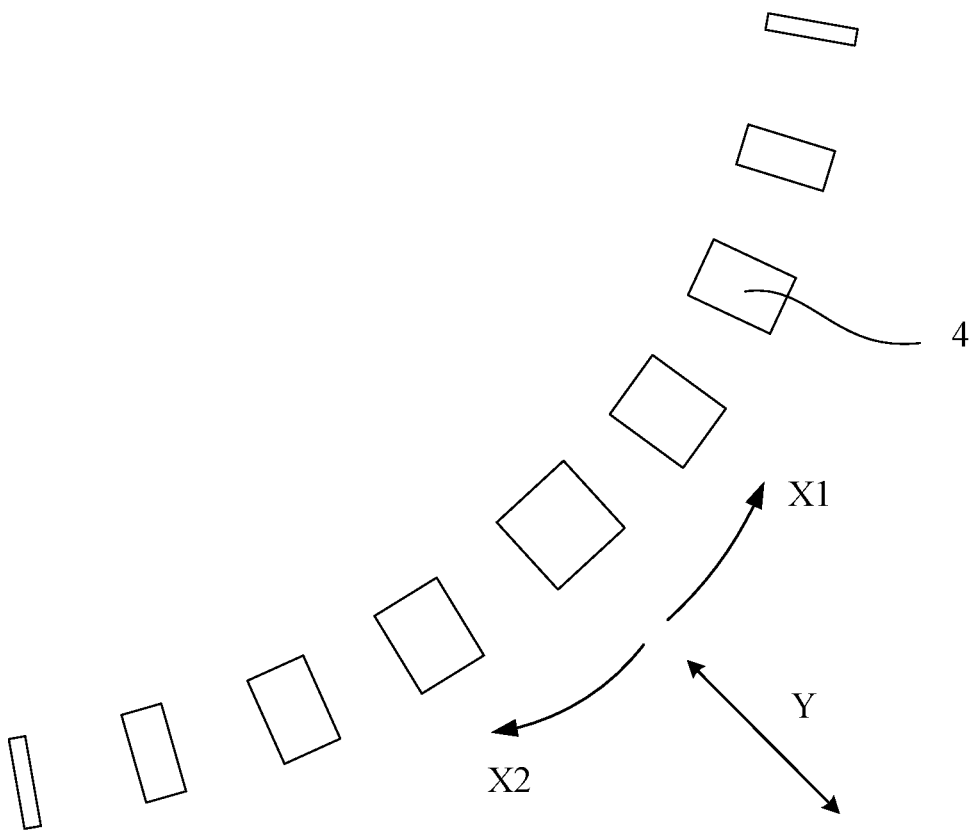
FIG. 5 is another structural diagram corresponding to the C region in FIG. 3.

In exemplary embodiments, as shown in FIG. 5, along the direction (i.e., X1 direction) from the center of the deformation region 232 toward the first bending portion 21 and along the direction (i.e., X2 direction) from the center of the deformation region 232 toward the second bending portion 22, dimensions of openings 4 in each of at least one row along the extending direction (i.e., X direction) of the arc-shaped side 13 are gradually reduced. From a center of a region where openings 4 in a row are located to two ends of the region, dimensions of the openings 4 in this row along the extending direction of the arc-shaped side 13 are gradually reduced, so that the center of the region where the openings 4 in this row are located absorbs more stress. Thus, the region where the openings 4 in this row are located is uniformly stressed along the extending direction of the arc-shaped side 13 after the attaching.

Figure 6:
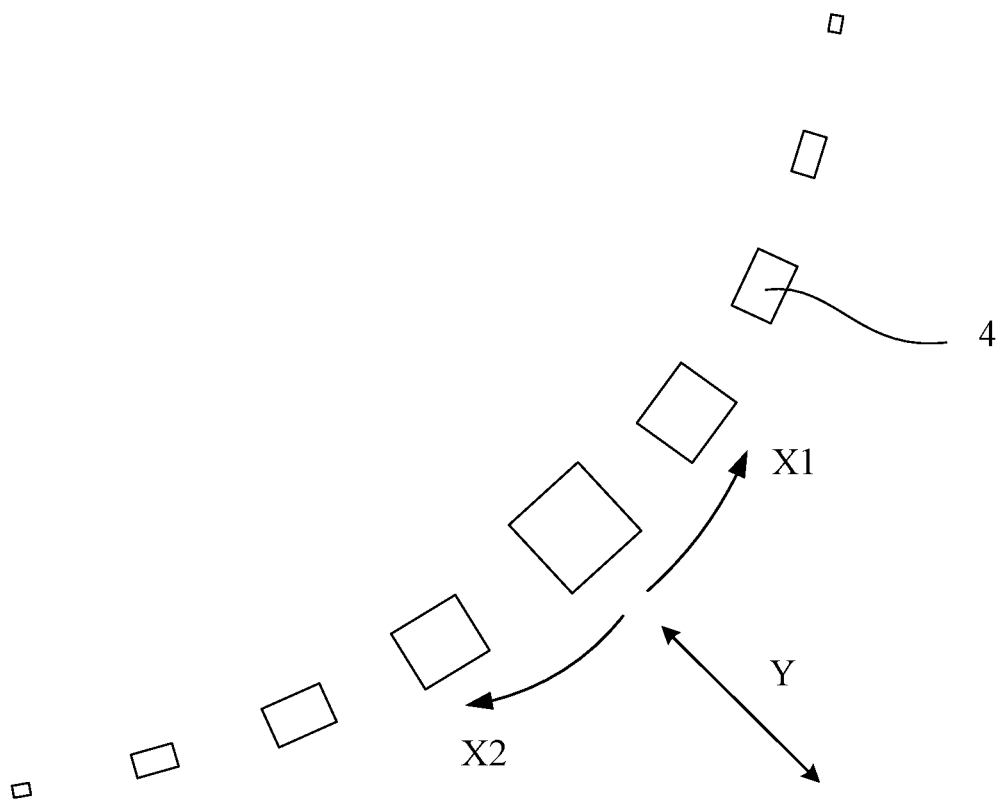
FIG. 6 is yet another structural diagram corresponding to the C region in FIG. 3.

In exemplary embodiments, as shown in FIG. 6, along the direction (i.e., X1 direction) from the center of the deformation region 232 toward the first bending portion 21 and along the direction (i.e., X2 direction) from the center of the deformation region 232 toward the second bending portion 22, openings 4 in each of at least one row are gradually reduced in dimension along the radial direction (i.e., Y direction) of the arc-shaped side 13, and are gradually reduced in dimension along the extending direction (i.e., X direction) of the arc-shaped side 13. The dimensions of the openings 4 along the radial direction of the arc-shaped side 13 and the extending direction of the arc-shaped side 13 are designed, so that the dimensions of the openings 4 are suitable for the stress to which the corner bending portion 23 is subjected. That is, openings 4 in a center of a region where openings 4 in a row are located that are stressed more have respective large dimensions and absorb more stress, and openings 4 in two ends of the region that are stressed less have respective small dimensions and absorb less stress. Thus, the region where the openings 4 in this row are located is uniformly stressed along the radial direction of the arc-shaped side 13 and the extending direction of the arc-shaped side 13 after the attaching, so that the risk of damage to the corner bending portion 23 is effectively reduced.

Figure 7:
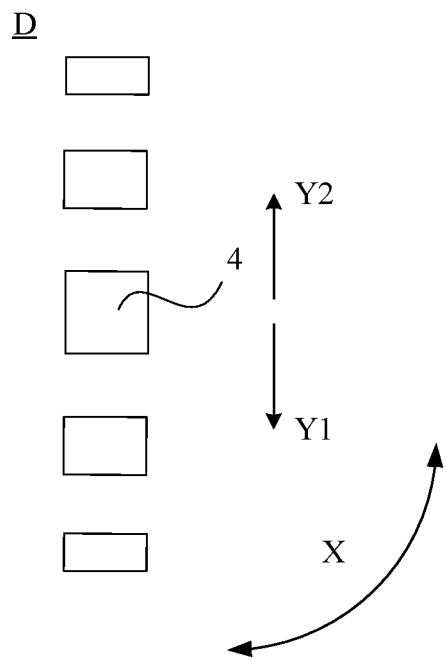
FIG. 7 is a structural diagram corresponding to the D region in FIG. 3.

In exemplary embodiments, as shown in FIG. 7, along a direction (i.e., Y1 direction) from the center of the deformation region 232 toward a side boundary of the deformation region 232 along the radial direction of the arc-shaped side 13 and along a direction (i.e., Y2 direction) from the center of the deformation region 232 toward another side boundary of the deformation region 232 along the radial direction of the arc-shaped side 13, dimensions, along the radial direction (i.e., Y direction) of the arc-shaped side 13, of openings 4 arranged along the radial direction of the arc-shaped side 13 are gradually reduced. After the corner bending portion 23 is curved and attached to the forming die 103, a center of a region where the openings 4 are located is stressed more than two ends of the region. Therefore, the dimensions of the openings 4 along the radial direction of the arc-shaped side 13 are gradually reduced from the center to the two ends, so that the center of the region where the openings 4 are located absorbs more stress. Thus, the region where the openings 4 are located is uniformly stressed along the radial direction of the arc-shaped side 13 after the attaching.

Figure 8:
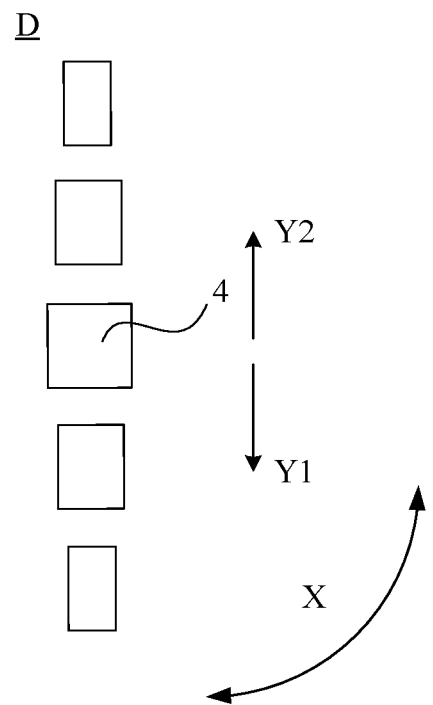
FIG. 8 is another structural diagram corresponding to the D region in FIG. 3.

In exemplary embodiments, as shown in FIG. 8, along the direction (i.e., Y1 direction) from the center of the deformation region 232 toward the side boundary of the deformation region 232 along the radial direction of the arc-shaped side 13 and along the direction (i.e., Y2 direction) from the center of the deformation region 232 toward the another side boundary of the deformation region 232 along the radial direction of the arc-shaped side 13, dimensions, along the extending direction (i.e., X direction) of the arc-shaped side 13, of openings 4 arranged along the radial direction of the arc-shaped side 13 are gradually reduced. From a center of a region where the openings 4 are located to two ends of the region, the dimensions of the openings 4 along the extending direction of the arc-shaped side 13 are gradually reduced, so that the center of the region where the openings 4 are located absorbs more stress. Thus, the region where the openings 4 are located is uniformly stressed along the extending direction of the arc-shaped side 13 after the attaching.

Figure 9:
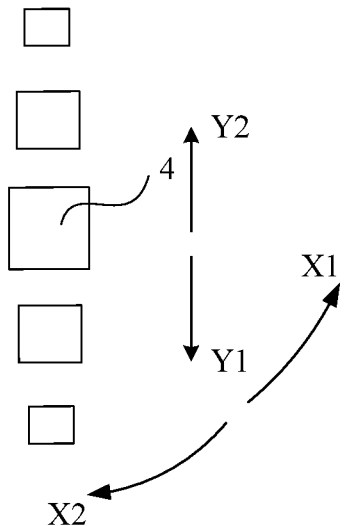
FIG. 9 is yet another structural diagram corresponding to the D region in FIG. 3.

In exemplary embodiments, as shown in FIG. 9, along the direction (i.e., Y1 direction) from the center of the deformation region 232 toward the side boundary of the deformation region 232 along the radial direction of the arc-shaped side 13 and along the direction (i.e., Y2 direction) from the center of the deformation region 232 toward the another side boundary of the deformation region 232 along the radial direction of the arc-shaped side 13, openings 4 arranged along the radial direction of the arc-shaped side 13 are gradually reduced in dimension along the radial direction of the arc-shaped side 13, and are gradually reduced in dimension along the extending direction of the arc-shaped side 13. The dimensions of the openings 4 along the radial direction of the arc-shaped side 13 and the extending direction of the arc-shaped side 13 are designed, so that the dimensions of the openings 4 are suitable for the stress to which the corner bending portion 23 is subjected. That is, openings 4 in a center of a region where the openings 4 are located that are stressed more have respective large dimensions and absorb more stress, and openings 4 in two ends of the region that are stressed less have respective small dimensions and absorb less stress. Thus, the region where the openings 4 are located is uniformly stressed along the radial direction of the arc-shaped side 13 and the extending direction of the arc-shaped side 13 after the attaching, so that the risk of damage to the corner bending portion 23 is effectively reduced.

Figure 10:
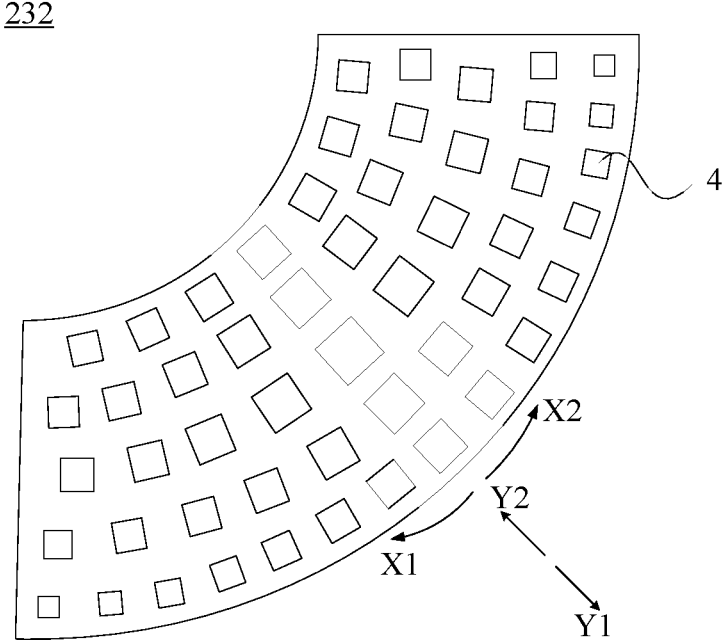
FIG. 10 is a diagram showing a distribution of openings corresponding to a deformation region in FIG. 3.

In exemplary embodiments, as shown in FIG. 10, along the direction (i.e., X1 direction) from the center of the deformation region 232 toward the first bending portion 21 and along the direction (i.e., X2 direction) from the center of the deformation region 232 toward the second bending portion 22, openings 4 in each row are gradually reduced in dimension along the extending direction of the arc-shaped side 13, and are gradually reduced in dimension along the radial direction of the arc-shaped side 13; moreover, along the direction (i.e., Y1 direction) from the center of the deformation region 232 toward the side boundary of the deformation region 232 along the radial direction of the arc-shaped side 13 and along the direction (i.e., Y2 direction) from the center of the deformation region 232 toward the another side boundary of the deformation region 232 along the radial direction of the arc-shaped side 13, openings 4 arranged along the radial direction of the arc-shaped side are gradually reduced in dimension along the extending direction of the arc-shaped side 13, and are gradually reduced in dimension along the radial direction of the arc-shaped side 13. Thus, after the corner bending portion 23 is attached to the forming die 103, the corner bending portion 23 is uniformly stressed along the X direction and the Y direction.

Figure 11:
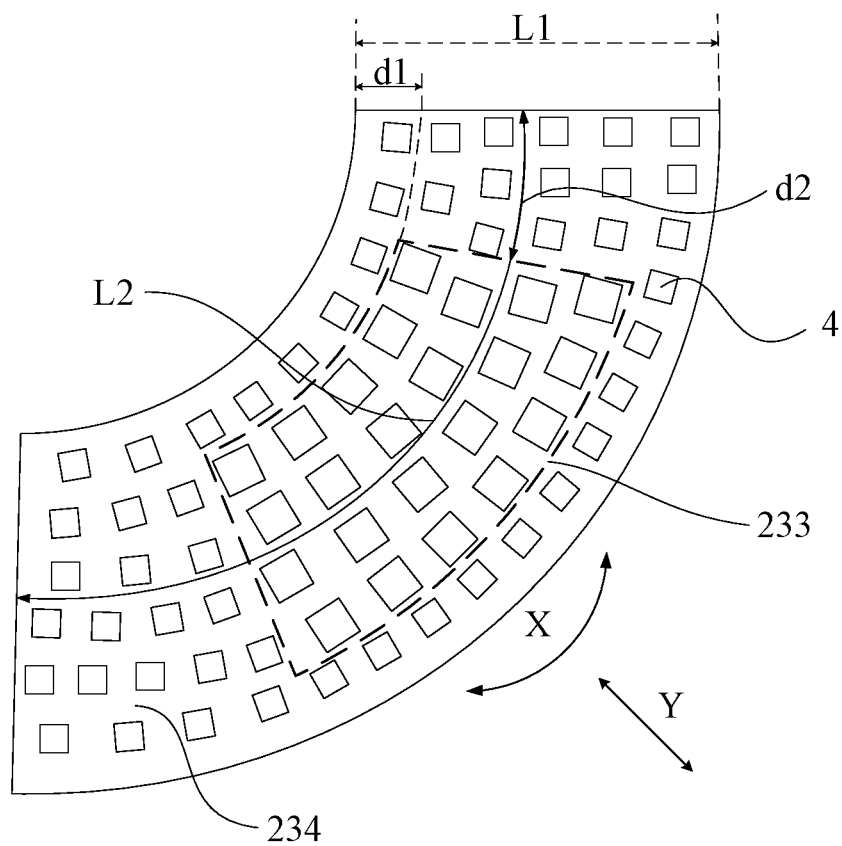
FIG. 11 is a diagram showing another distribution of openings corresponding to a deformation region in FIG. 3.

In exemplary embodiments, as shown in FIG. 11, the deformation region 232 includes a middle region 233 and an edge region 234, and the edge region 234 is arranged around the middle region 233.

In embodiments, a dimension of an opening 4 in the middle region 233 along the radial direction (i.e., Y direction in FIG. 11) of the arc-shaped side 13 is greater than a dimension of an opening 4 in the edge region 234 along the radial direction of the arc-shaped side 13. After the corner bending portion 23 is curved and attached to the forming die 103, the middle region 233 is stressed more than the edge region 234. Therefore, compared to the edge region 234, the dimension of opening 4 in the middle region 233 is larger, so that the middle region 233 absorbs more stress. Thus, the middle region 233 and the edge region 234 are uniformly stressed along the radial direction of the arc-shaped side 13 after the attaching.

In embodiments, a dimension of an opening 4 in the middle region 233 along the extending direction (i.e., X direction in FIG. 11) of the arc-shaped side 13 is greater than a dimension of an opening 4 in the edge region 234 along the extending direction of the arc-shaped side 13. Thus, the middle region 233 and the edge region 234 are uniformly stressed along the extending direction of the arc-shaped side 13 after the attaching.

In embodiments, a dimension of an opening 4 in the middle region 233 along the radial direction (i.e., Y direction in FIG. 11) of the arc-shaped side 13 is greater than a dimension of an opening 4 in the edge region 234 along the radial direction of the arc-shaped side 13, and a dimension of the opening 4 in the middle region 233 along the extending direction of the arc-shaped side 13 is greater than a dimension of the opening 4 in the edge region 234 along the extending direction of the arc-shaped side 13. Thus, the middle region 233 and the edge region 234 are uniformly stressed along the radial direction of the arc-shaped side 13 and the extending direction of the arc-shaped side 13 after the attaching.

In embodiments, dimensions of openings 4 in the middle region 233 along the radial direction (i.e., Y direction in FIG. 11) of the arc-shaped side 13 are substantially the same. Thus, the structure of the corner bending portion 23 may be simplified, so as to simplify the structure of the flexible display screen 102, which may improve the production efficiency of the flexible display screen 102.

In embodiments, dimension of openings 4 in the edge region 234 along the radial direction (i.e., Y direction in FIG. 11) of the arc-shaped side 13 are substantially the same. Thus, the structure of the corner bending portion 23 may be simplified, so as to simplify the structure of the flexible display screen 102, which may improve the production efficiency of the flexible display screen 102.

In embodiments, dimensions of the openings 4 in the middle region 233 along the extending direction (i.e., X direction in FIG. 11) of the arc-shaped side 13 are substantially the same. Thus, the structure of the corner bending portion 23 may be simplified, so as to simplify the structure of the flexible display screen 102, which may improve the production efficiency of the flexible display screen 102.

In embodiments, dimensions of the openings 4 in the edge region 234 along the extending direction (i.e., X direction in FIG. 11) of the arc-shaped side 13 are substantially the same. Thus, the structure of the corner bending portion 23 may be simplified, so as to simplify the structure of the flexible display screen 102, which may improve the production efficiency of the flexible display screen 102.

In embodiments, dimensions of the openings 4 in the middle region 233 along the radial direction (i.e., Y direction in FIG. 11) of the arc-shaped side 13 and the extending direction (i.e., X direction in FIG. 11) of the arc-shaped side 13 are substantially the same, and dimensions of the openings 4 in the edge region 234 along the radial direction of the arc-shaped side 13 and the extending direction of the arc-shaped side 13 are substantially the same. Thus, the structure of the corner bending portion 23 may be simplified, so as to simplify the structure of the flexible display screen 102, which may improve the production efficiency of the flexible display screen 102.

In exemplary embodiments, as shown in FIG. 11, a dimension of the deformation region 232 along the radial direction (i.e., Y direction) of the arc-shaped side 13 is L1. A minimum distance d1, along the radial direction of the arc-shaped side 13, between a boundary of the middle region 233 and a boundary of the deformation region 232 that are close to each other is in a range of ¼ L1 to ⅓ L1. For example, the minimum distance d1 is 0.25 L1, 0.26 L1, 0.275 L1, 0.3 L1 or 0.33 L1.

In exemplary embodiments, as shown in FIG. 11, a dimension of the deformation region 232 along the extending direction (i.e., X direction) of the arc-shaped side 13 is L2. A distance d2, along the extending direction of the arc-shaped side 13, between a boundary of the middle region 233 and a boundary of the deformation region 232 that are close to each other is in a range of ⅙ L2 to ⅕ L2. For example, the distance d2 is 0.166 L2, 0.17 L2, 0.175 L2, 0.18 L2 or 0.2 L2.

It will be noted that L2 and d2 in FIG. 11 are not linear lengths, L2 is a total arc length, along the X direction, of a region where openings 4 in a row are located, and d2 is an arc length, along the X direction, between a portion of the boundary of the middle region 233 in the region where the openings 4 in this row are located and a portion of the boundary of the deformation region 232 in the region where the openings 4 in this row are located.

Figure 12:
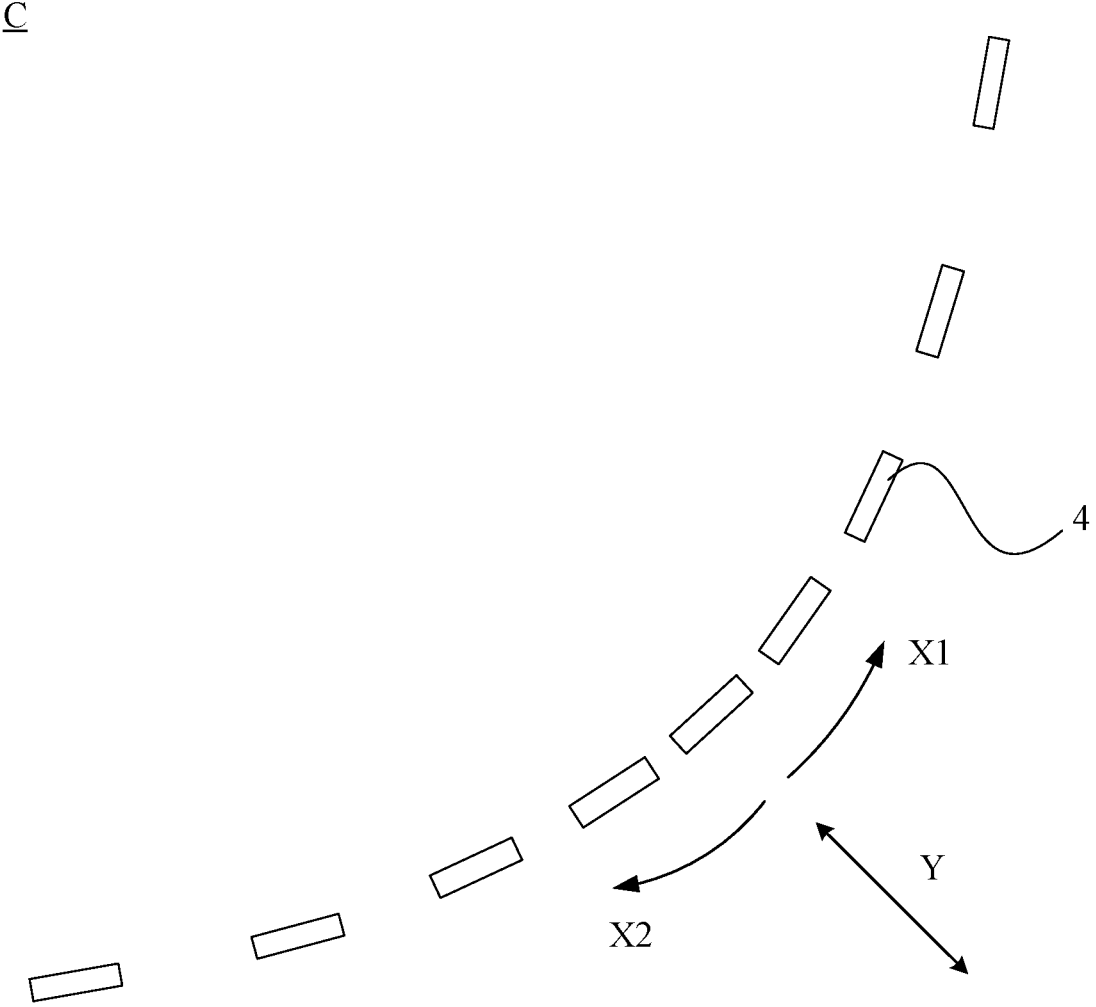
FIG. 12 is yet another structural diagram corresponding to the C region in FIG. 3.

In exemplary embodiments, as shown in FIG. 12, along the direction (i.e., X1 direction) from the center of the deformation region 232 toward the first bending portion 21 and along the direction (i.e., X2 direction) from the center of the deformation region 232 toward the second bending portion 22, distances, each of which is a distance between two adjacent openings 4 in openings 4 in each of at least one row, are gradually increased.

Figure 13:
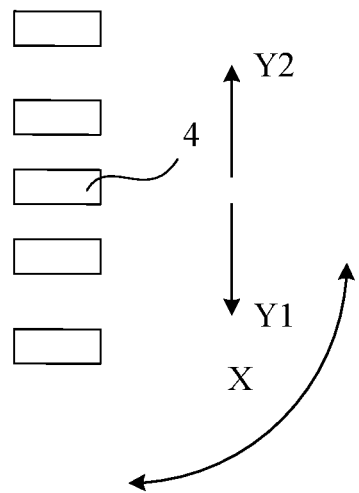
FIG. 13 is yet another structural diagram corresponding to the D region in FIG. 3.

In exemplary embodiments, as shown in FIG. 13, along the direction (i.e., Y1 direction) from the center of the deformation region 232 toward the side boundary of the deformation region 232 along the radial direction of the arc-shaped side 13 and along the direction (i.e., Y2 direction) from the center of the deformation region 232 toward the another side boundary of the deformation region 232 along the radial direction of the arc-shaped side 13, distances, each of which is a distance between two adjacent openings 4 in openings 4 arranged along the radial direction of the arc-shaped side 13, are gradually increased.

In embodiments, along the direction from the center of the deformation region 232 toward the first bending portion 21 and along the direction from the center of the deformation region 232 toward the second bending portion 22, distances, each of which is a distance between two adjacent openings 4 in openings 4 in each of at least one row, are gradually increased. Moreover, along the direction from the center of the deformation region 232 toward the side boundary of the deformation region 232 along the radial direction of the arc-shaped side 13 and along the direction from the center of the deformation region 232 toward the another side boundary of the deformation region 232 along the radial direction of the arc-shaped side 13, distances, each of which is a distance between two adjacent openings 4 in openings 4 arranged along the radial direction of the arc-shaped side 13, are gradually increased. Therefore, from the center of the deformation region 232 to four sides of the corner bending portion 23, the stress to which the corner bending portion 23 is subjected gradually decreases. Thus, from the center of the deformation region 232 to the four sides of the corner bending portion 23, an arrangement density of the openings 4 is gradually reduced, so that a whole of the corner bending portion 23 is uniformly stressed.

Figure 14:
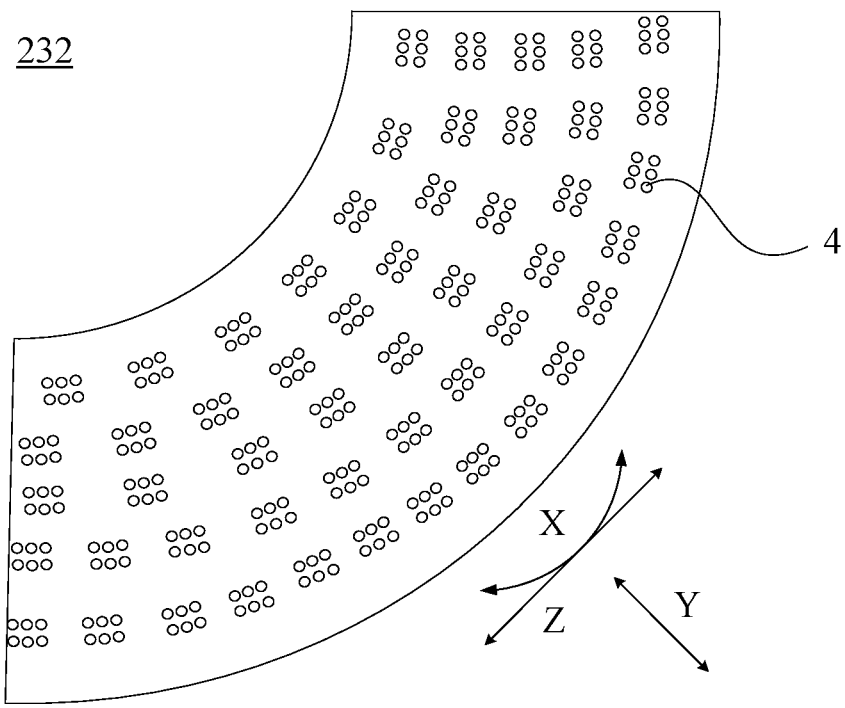
FIG. 14 is a diagram showing yet another distribution of openings corresponding to a deformation region in FIG. 3.

In exemplary embodiments, as shown in FIG. 14, the plurality of openings 4 are divided into a plurality of groups, and the plurality of groups of openings 4 are arranged in a plurality of rows along the radial direction (i.e., Y direction) of the arc-shaped side 13. Groups of openings 4 in each row are arranged at intervals along the extending direction (i.e., X direction) of the arc-shaped side 13 or a tangential direction Z of the arc-shaped side 13. A distance between two adjacent openings 4 in each group of openings 4 is less than a distance between two openings 4 that are closest to each other in two adjacent groups of openings 4. Thus, the structural diversity of the opening 4 may be increased, which is beneficial to improving the structural strength of the flexible display screen 102.

In embodiments, the number of openings 4 constituting each group of openings 4 in the middle region 233 is greater than the number of openings 4 constituting each group of openings 4 in the edge region 234. Two adjacent groups of openings are provided with at least one sub-pixel therebetween.

Figure 15:
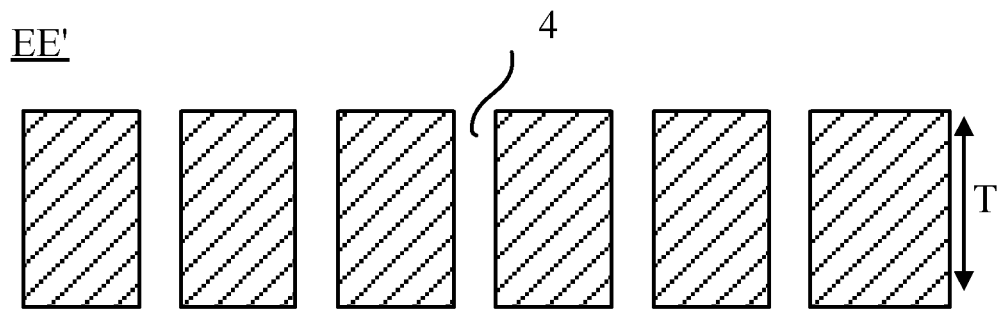
FIG. 15 is a sectional view of openings in a deformation region in FIG. 3 taken along the EE' direction.

In exemplary embodiments, as shown in FIG. 15, the opening 4 is a through hole penetrating through the corner bending portion 23 along a thickness direction T of the corner bending portion 23. The opening 4 arranged in the through hole is able to absorb more stress, so that the corner bending portion 23 is ensured to be uniformly stressed to a great extent.

Figure 16:
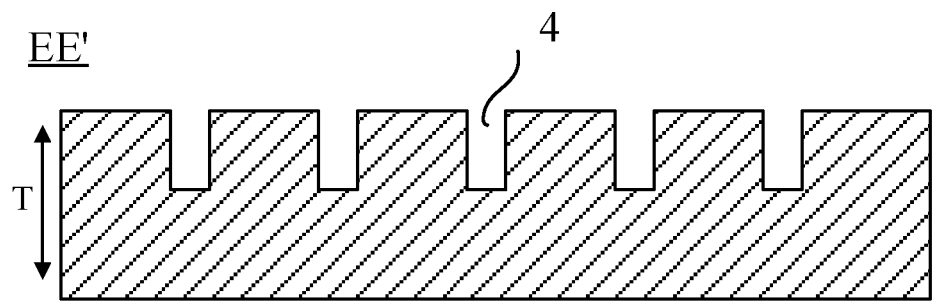
FIG. 16 is another sectional view of openings in a deformation region in FIG. 3 taken along the EE' direction.

In exemplary embodiments, as shown in FIG. 16, the opening 4 is a groove recessed along the thickness direction T of the corner bending portion 23. A notch of the groove faces the bending direction B of the corner bending portion 23. The groove-shaped opening 4 may ensure the structural strength on a premise of absorbing the stress.

Figure 17:
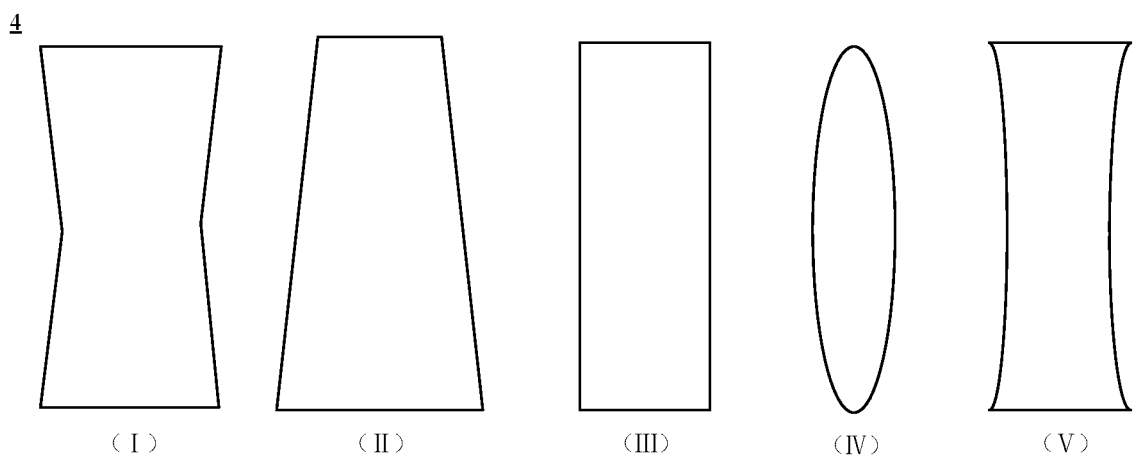
FIG. 17 is a diagram showing the shapes of openings, in accordance with some embodiments.

In exemplary embodiments, as shown in FIG. 17, the openings 4 may have one or more of a circular shape (referring to FIG. 14), an elliptical shape (referring to (IV) in FIG. 17), or a polygonal shape (referring to (I), (II), (III) or (V) in FIG. 17). Thus, the structural diversity of the opening 4 may be increased. For example, the opening 4 has a hexagonal shape (referring to (I) in FIG. 17), and has a narrow middle and two wide ends. For example, the opening 4 has a trapezoidal shape (referring to (II) in FIG. 17). For example, the opening 4 has a strip shape. A length extending direction of the opening 4 is substantially the same as the extending direction of the arc-shaped side (referring to (V) in FIG. 17); and/or a length extending direction of the opening 4 is substantially tangent to the extending direction of the arc-shaped side (referring to (III) in FIG. 17).

In embodiments, the plurality of openings 4 have the same shape. Thus, the structure of the corner bending portion 23 may be simplified, so as to simplify the structure of the flexible display screen 102. For example, each opening 4 has a circular shape or a rectangular shape.

Figure 18:
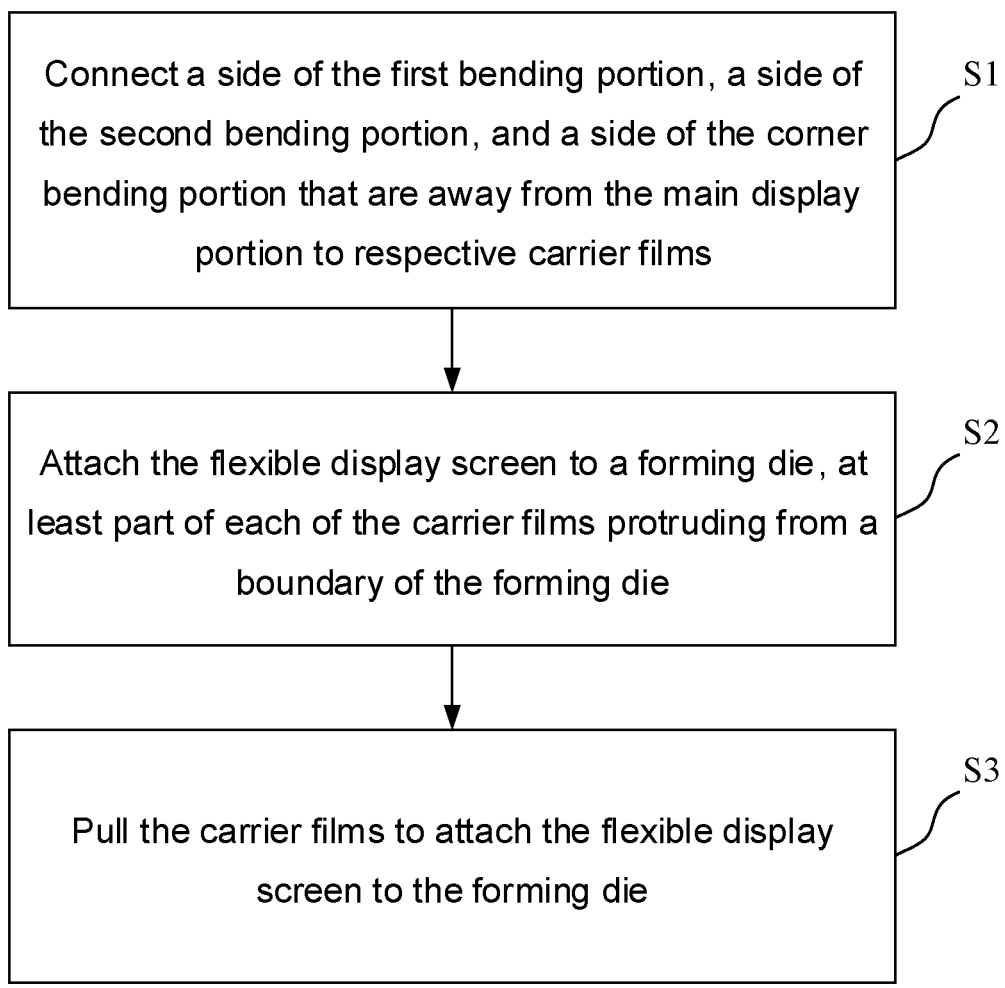
FIG. 18 is a flow diagram of a method for assembling a flexible display screen, in accordance with some embodiments.

As shown in FIG. 18, embodiments of the present disclosure provide a method for assembling the flexible display screen 102.

In some embodiments, as shown in FIG. 18, the method for assembling the flexible display screen 102 includes S1 to S3.

Figure 21:
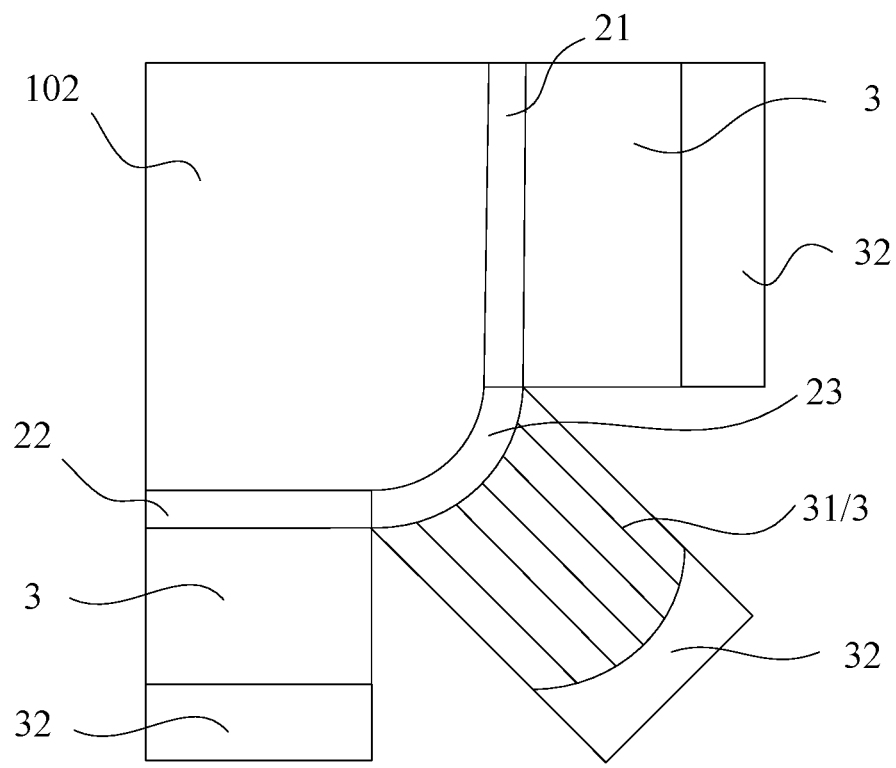
FIG. 21 is a structural diagram showing an assembly of a flexible display screen, in accordance with some embodiments.

In S1, as shown in FIG. 21, a side of the first bending portion 21, a side of the second bending portion 22, and a side of the corner bending portion 23 that are away from the main display portion 1 are connected to respective carrier films 3.

In S2, the flexible display screen 102 is attached to the forming die 103. At least part of each of the carrier films protrudes from a boundary of the forming die.

In S3, the carrier films 3 are pulled to completely attach the flexible display screen 102 to the forming die 103.

Through the assembling method, the edge of the flexible display screen 102 reaches an optimal attaching position of the forming die 103. In this case, the whole of the corner bending portion 23 is uniformly stressed, and an edge of the corner bending portion 23 away from the arc-shaped side 13 of the main display portion 1 is neither in tension nor in compression, which reduces the risk of wrinkling and cracking of the corner bending portion 23. In a case where the corner bending portion 23 of the flexible display screen 102 has the deformation region 232 and the wiring region 231, the wiring region 231 may be effectively protected.

Figure 19:
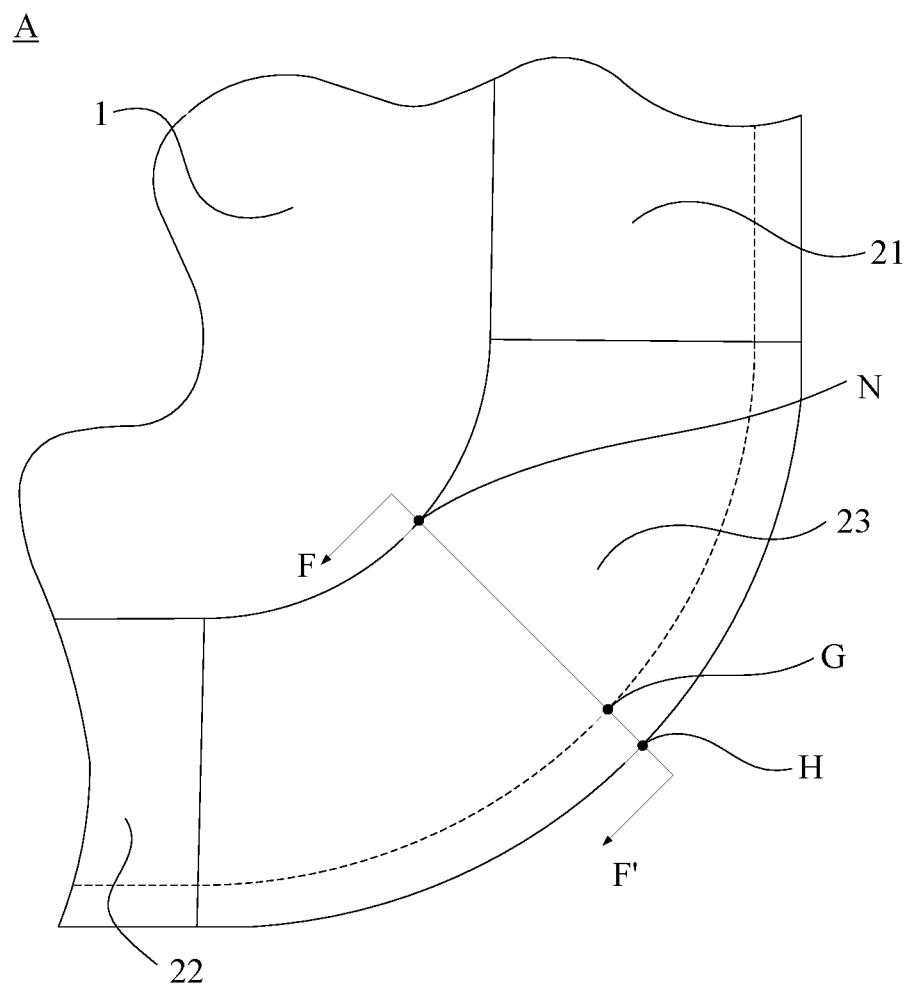
FIG. 19 is a structural comparison diagram of a flexible display screen assembled and unassembled through carrier films, in accordance with some embodiments.

As shown in FIG. 19, in a case where the carrier film 3 is not used for pulling and assembling, the edge of the flexible display screen 102 can only reach a position indicated by the dotted line. After the carrier films 3 are used for assembling, a region enclosed by the edge of the flexible display screen 102 is expanded by a circle compared to the position of the dotted line.

Figure 20:
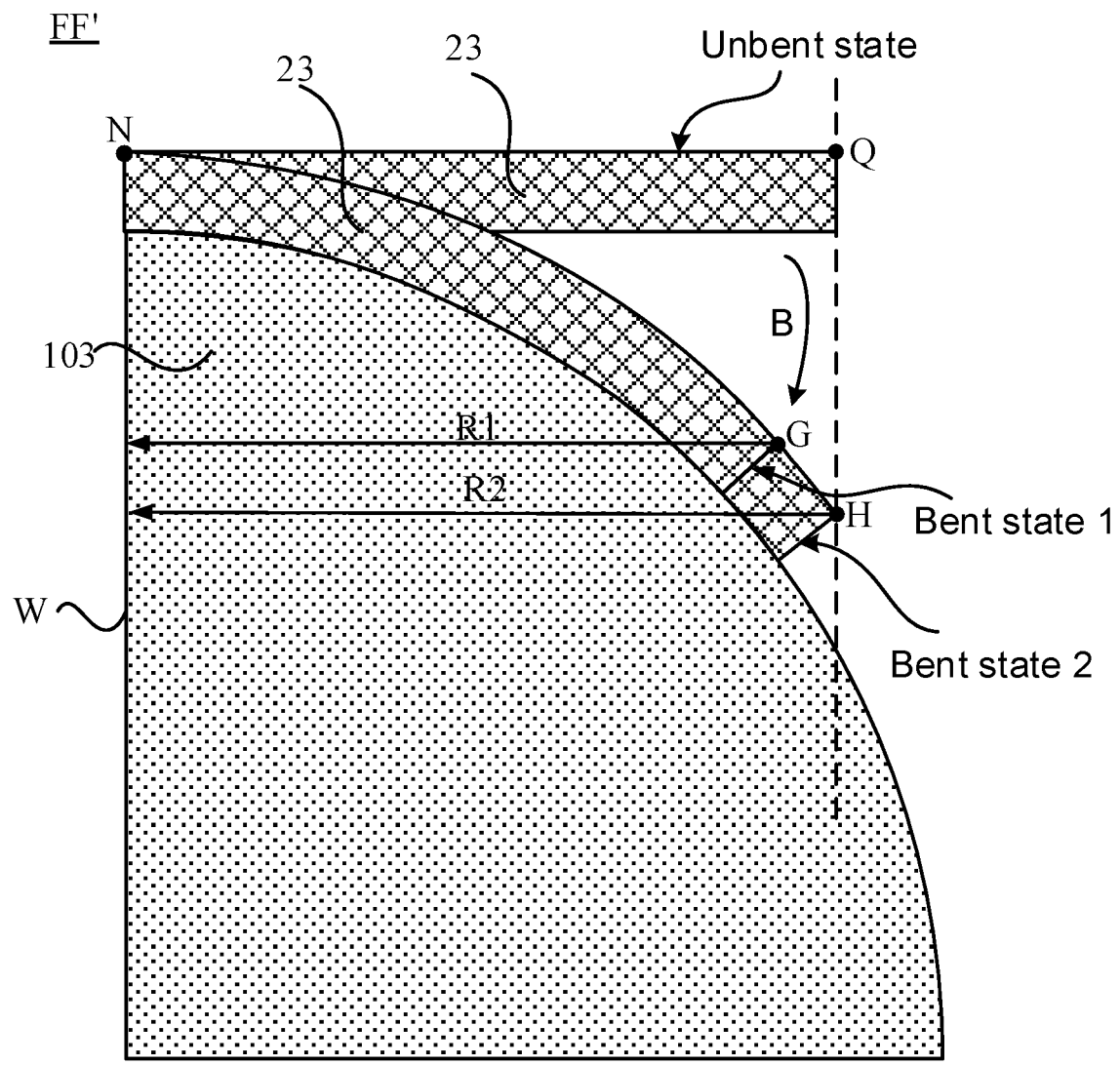
FIG. 20 is a sectional view taken along the FF' direction in FIG. 19.

FIG. 20 is a sectional view taken along the FF' direction in FIG. 19. In a case where the carrier film 3 is not used for assembling (e.g., in the bent state 1 shown in FIG. 20), an intersection point of a section line and a boundary of the flexible display screen 102 is a G point (as shown in FIGS. 19 and 20). In a case where the carrier films 3 are used for assembling (e.g., in the bent state 2 shown in FIG. 20), an intersection point of a section line and the boundary of the flexible display screen 102 is an H point (as shown in FIGS. 19 and 20). An intersection point of a section line and a boundary of the main display portion 1 of the flexible display screen 102 is an N point (as shown in FIGS. 19 and 20).

As shown in FIG. 20, Q is an outer edge position of the corner bending portion 23 in a case where the corner bending portion 23 is not bent (i.e., in an unbent state). QN is a length of the corner bending portion 23 in the case where the corner bending portion 23 is not bent. GN is an arc length of the corner bending portion 23 after being bent in a case where the corner bending portion 23 is not pulled by the carrier film 3. HN is an arc length of the corner bending portion 23 after being pulled by the carrier films 3. Taking a boundary W where the N point is located as an axis, R1 is a radius of a circle passing through the G point along a circumferential direction of the axis. Taking the boundary W where the N point is located as an axis, R2 is a radius of a circle passing through the H point along the circumferential direction of the axis.

In a case where the carrier film 3 is not used for pulling, after the corner bending portion 23 is attached, an outer edge of the corner bending portion 23 can only reach the G point. In this case, the arc length GN is equal to the length QN, and the radius R1 of the circle where the G point is located is less than the length QN of the corner bending portion 23 in a natural state before the corner bending portion 23 is attached. Therefore, in this case, the outer edge of the corner bending portion 23 is compressed, and wrinkles are easily generated.

However, in a case where the carrier films 3 are used for pulling, after the corner bending portion 23 is attached, the outer edge of the corner bending portion 23 may reach the H point. In this case, the radius R2 of the circle where the H point is located is equal to the length QN of the corner bending portion 23 in the natural state before the corner bending portion 23 is attached. Therefore, in this case, the outer edge of the corner bending portion 23 is neither in tension nor in compression, which reduces the risk of wrinkling and cracking of the outer edge of the corner bending portion 23.

In some embodiments, as shown in FIG. 21, a side of the carrier film 3 away from the main display portion 1 is connected to a clip 32, so that the carrier film 3 is subjected to a uniform pulling force, and the flexible display screen 102 is pulled more effectively.

In exemplary embodiments, as shown in FIG. 21, the carrier film 3 connected to the corner bending portion 23 is provided with a plurality of slits 31 distributed at intervals. The plurality of slits 31 are spaced apart along the extending direction of the arc-shaped side 13. Each slit 31 extends along the radial direction of the arc-shaped side 13, and an end of each slit 31 extends to a side of the carrier film 3 connected to the corner bending portion 23. Thus, the carrier film 3 connected to the corner bending portion 23 may be divided into a plurality of portions, and each of the plurality of portions is independently stressed. Therefore, the plurality of portions are not influenced by each other, so as to adapt to different tensile stresses required by the corner bending portion 23 at different positions, so that after being attached, the corner bending portion 23 is stressed in a balanced manner at all positions.

The flexible display screen 102 described above is uniformly stressed after the attaching is completed, which may effectively reduce a probability of cracking, wrinkling and damage at corners of the flexible display screen 102.

Figure 22:
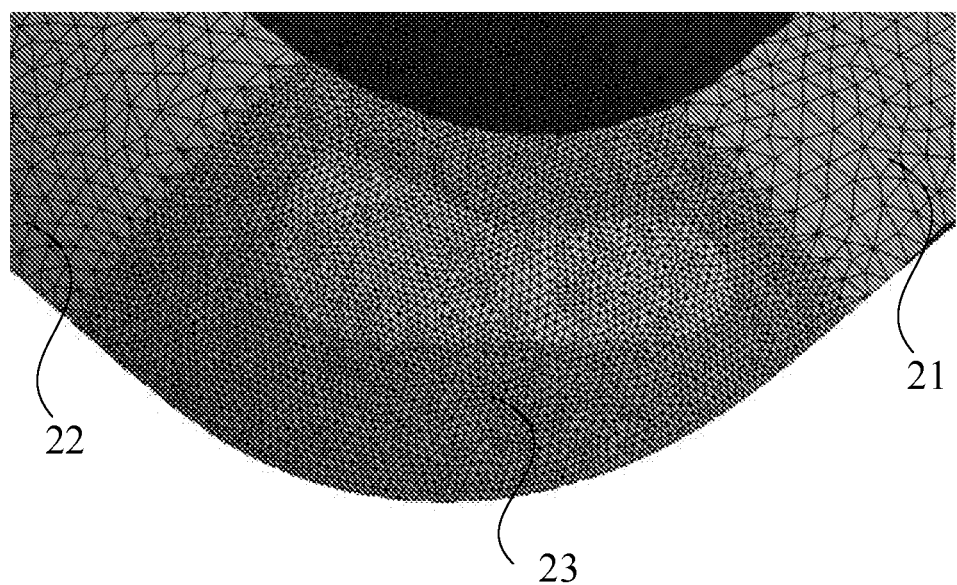
FIG. 22 is a simulation diagram showing variation and distribution of stress in a case where a flexible display screen is not provided with openings, in accordance with some embodiments.

As shown in FIG. 22, in a case where the openings 4 are not provided, a central region of the corner bending portion 23 of the flexible display screen 102 is stressed more than a surrounding region. In the attaching process, the corner bending portion 23 is easily wrinkled, resulting in a poor attaching, and the corner bending portion 23 is also prone to cracking due to an uneven stress. In use, the central region stressed more is easily damaged after being collided.

Figure 23:
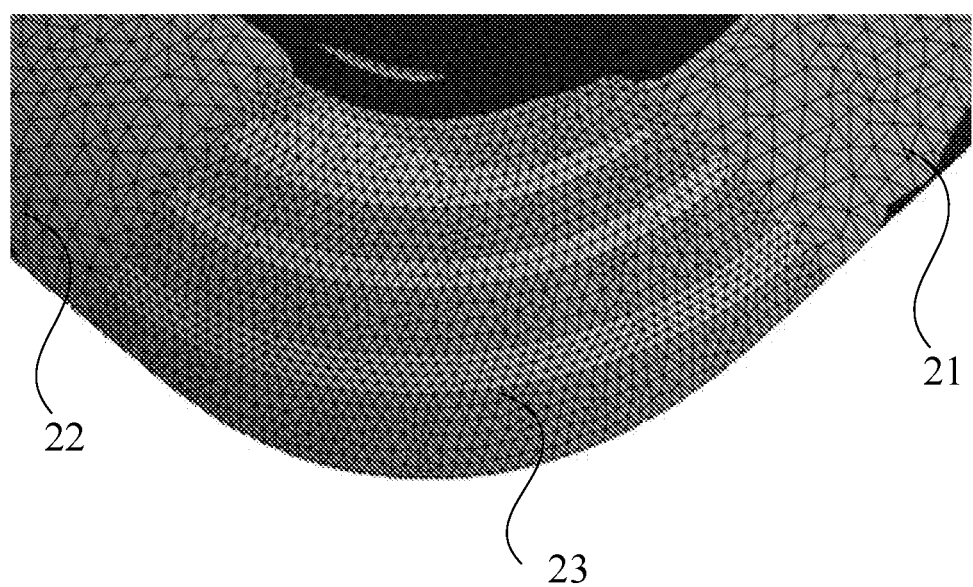
FIG. 23 is a simulation diagram showing variation and distribution of stress in a case where a flexible display screen is provided with openings, in accordance with some embodiments.

As shown in FIG. 23, after the openings 4 are provided, the whole of the corner bending portion 23 of the flexible display screen 102 is stressed less and uniformly, so that the damage of the corner bending portion 23 is effectively avoided.

In FIG. 22 or 23, a lighter colored region is stressed more, and a darker colored region is stressed less.

In another aspect, as shown in FIG. 1, the embodiments of the present disclosure provide the electronic apparatus 101. The electronic apparatus 101 includes the flexible display screen 102.

The electronic apparatus 101 may be any apparatus that displays images whether moving (e.g., videos) or stationary (e.g., still images). More specifically, it is anticipated that the embodiments may be implemented in, or associated with, a variety of electronic apparatuses. The variety of electronic apparatuses are, for example (but not limit to), mobile phones, wireless apparatuses, personal data assistants (PDAs), hand-held or portable computers, global positioning system (GPS) receivers/navigators, cameras, MP4 video players, camcorders, game consoles, watches, clocks, calculators, television monitors, flat panel displays, computer monitors, auto displays (e.g., odometer displays), navigators, cockpit controllers and/or displays, camera view displays (e.g., rear-view camera displays in vehicles), electronic photos, electronic billboards or signs, projectors, architectural structures, packaging and aesthetic structures (e.g., displays for displaying an image of a piece of jewelry).

The foregoing descriptions are only specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A flexible display screen, comprising:
   a main display portion including a first side, an arc-shaped side and a second side that are connected in sequence;
   a first bending portion located on a side of the main display portion where the first side is located and connected to the first side;
   a second bending portion located on a side of the main display portion where the second side is located and connected to the second side; and
   a corner bending portion located on a side of the main display portion where the arc-shaped side is located and connected to the arc-shaped side;
   wherein the first bending portion, the corner bending portion and the second bending portion are connected in sequence, and constitute a display region together with the main display portion; and a plurality of openings are disposed in the corner bending portion, and face a bending direction of the corner bending portion; and
   the plurality of openings have a same shape, the plurality of openings are arranged in a plurality of rows in a radial direction of the arc-shaped side, openings in each row are arranged at intervals along an extending direction of the arc-shaped side, and the openings in each row are arranged in a same arc level along the arc-shaped side.

2. The flexible display screen according to claim 1, wherein the corner bending portion has a wiring region and a deformation region that are sequentially disposed along a direction from the corner bending portion toward the main display portion; wherein
the deformation region is connected to the arc-shaped side, and the plurality of openings are disposed in the deformation region; and
at least one first signal line is disposed in the wiring region.

3. The flexible display screen according to claim 2, wherein along a direction from a center of the deformation region toward the first bending portion and along a direction from the center of the deformation region toward the second bending portion,
dimensions of openings in each of at least one row along the radial direction of the arc-shaped side are reduced in sequence; and/or
dimensions of openings in each of at least one row along the extending direction of the arc-shaped side are reduced in sequence.

4. The flexible display screen according to claim 2, wherein along a direction from a center of the deformation region toward a side boundary of the deformation region along the radial direction of the arc-shaped side and along a direction from the center of the deformation region toward another side boundary of the deformation region along the radial direction of the arc-shaped side,
dimensions, along the radial direction of the arc-shaped side, of openings arranged along the radial direction of the arc-shaped side are reduced in sequence; and/or
dimensions, along the extending direction of the arc-shaped side, of openings arranged along the radial direction of the arc-shaped side are reduced in sequence.

5. The flexible display screen according to claim 2, wherein the deformation region includes a middle region and an edge region, and the edge region surrounds the middle region; wherein
a dimension, along the radial direction of the arc-shaped side, of an opening in the plurality of openings located in the middle region is greater than a dimension, along the radial direction of the arc-shaped side, of an opening in the plurality of openings located in the edge region; and/or
a dimension, along the extending direction of the arc-shaped side, of an opening in the plurality of openings located in the middle region is greater than a dimension, along the extending direction of the arc-shaped side, of an opening in the plurality of openings located in the edge region.

6. The flexible display screen according to claim 5, wherein dimensions, along the radial direction of the arc-shaped side, of openings in the plurality of openings located in the middle region are substantially same; and/or
dimensions, along the radial direction of the arc-shaped side, of openings in the plurality of openings located in the edge region are substantially same.

7. The flexible display screen according to claim 5, wherein a dimension of the deformation region along the radial direction of the arc-shaped side is L1, and a minimum distance, along the radial direction of the arc-shaped side, between a boundary of the middle region and a boundary of the deformation region that are close to each other is in a range of ¼ L1 to ⅓ L1; and/or
a dimension of the deformation region along the extending direction of the arc-shaped side is L2, and a distance, along the extending direction of the arc-shaped side, between a boundary of the middle region and a boundary of the deformation region that are close to each other is in a range of ⅙ L2 to ⅛ L2.

8. The flexible display screen according to claim 2, wherein along a direction from a center of the deformation region toward the first bending portion and along a direction from the center of the deformation region toward the second bending portion, distances, each of which is a distance between two adjacent openings in openings in each of at least one row, are increased in sequence; and/or
along a direction from a center of the deformation region toward a side boundary of the deformation region along the radial direction of the arc-shaped side and along a direction from the center of the deformation region toward another side boundary of the deformation region along the radial direction of the arc-shaped side, distances, each of which is a distance between two adjacent openings in openings arranged along the radial direction of the arc-shaped side, are increased in sequence.

9. The flexible display screen according to claim 1, wherein the plurality of openings have a strip shape, and a length extending direction of the plurality of openings is substantially same as the extending direction of the arc-shaped side; and/or a length extending direction of the plurality of openings is substantially tangent to the extending direction of the arc-shaped side.

10. The flexible display screen according to claim 1, wherein the plurality of openings are divided into a plurality of groups that are arranged in a plurality of rows along the radial direction of the arc-shaped side, and groups of openings in each row are arranged at intervals along the extending direction of the arc-shaped side or a tangential direction of the arc-shaped side; and
a distance between two adjacent openings in each group of openings is less than a distance between two openings that are closest to each other in two adjacent groups of openings.

11. The flexible display screen according to claim 1, wherein the plurality of openings have a circular shape, an elliptical shape, or a polygonal shape.

12. The flexible display screen according to claim 1, wherein the plurality of openings are through holes penetrating through the corner bending portion along a thickness direction of the corner bending portion; or
the plurality of openings are grooves recessed along a thickness direction of the corner bending portion.

13. The flexible display screen according to claim 1, wherein the corner bending portion includes:
a plurality of sub-pixels, wherein two adjacent openings are provided with at least one sub-pixel therebetween; or
the plurality of openings are divided into a plurality of groups, and two adjacent groups of openings are provided with at least one sub-pixel therebetween.

14. The flexible display screen according to claim 13, wherein the corner bending portion has a wiring region and a deformation region, the plurality of openings are disposed in the deformation region, and at least one first signal line is disposed in the wiring region; and
the corner bending portion further includes:
a plurality of second signal lines, wherein each sub-pixel is electrically connected to at least one second signal line; the plurality of second signal lines extend in gaps between the plurality of openings, and each second signal line is electrically connected to a first signal line in the at least one first signal line.

15. A method for assembling a flexible display screen, wherein the flexible display screen is the flexible display screen according to claim 1; the method comprises:
connecting a side of the first bending portion, a side of the second bending portion, and a side of the corner bending portion that are away from the main display portion to respective carrier films;
attaching the flexible display screen to a forming die, at least part of each of the carrier films protruding from a boundary of the forming die; and
pulling the carrier films to attach the flexible display screen to the forming die.

16. The method for assembling the flexible display screen according to claim 15, wherein a carrier film connected to the corner bending portion of the flexible display screen is provided with a plurality of slits arranged at intervals, and the plurality of slits are arranged at intervals along an extending direction of the arc-shaped side of the main display portion of the flexible display screen; each slit extends along a radial direction of the arc-shaped side, and an end of each slit extends to a side of the carrier film connected to the corner bending portion.

17. An electronic apparatus comprising the flexible display screen according to claim 1.

18. The flexible display screen according to claim 3, wherein along a direction from the center of the deformation region toward a side boundary of the deformation region along the radial direction of the arc-shaped side and along a direction from the center of the deformation region toward another side boundary of the deformation region along the radial direction of the arc-shaped side,
dimensions, along the radial direction of the arc-shaped side, of openings arranged along the radial direction of the arc-shaped side are reduced in sequence; and/or
dimensions, along the extending direction of the arc-shaped side, of openings arranged along the radial direction of the arc-shaped side are reduced in sequence.

19. The flexible display screen according to claim 3, wherein the deformation region includes a middle region and an edge region, and the edge region surrounds the middle region; wherein
a dimension, along the radial direction of the arc-shaped side, of an opening in the plurality of openings located in the middle region is greater than a dimension, along the radial direction of the arc-shaped side, of an opening in the plurality of openings located in the edge region; and/or
a dimension, along the extending direction of the arc-shaped side, of an opening in the plurality of openings located in the middle region is greater than a dimension, along the extending direction of the arc-shaped side, of an opening in the plurality of openings located in the edge region.

* * * * *

UNITED STATES PATENT AND TRADEMARK OFFICE
CERTIFICATE OF CORRECTION

| | | |
|---|---|---|
| PATENT NO. | : 12,411,522 B2 | Page 1 of 1 |
| APPLICATION NO. | : 17/785113 | |
| DATED | : September 9, 2025 | |
| INVENTOR(S) | : Yaming Wang | |

It is certified that error appears in the above-identified patent and that said Letters Patent is hereby corrected as shown below:

In the Claims

Claim 7, Column 18, Line 4, "⅛ L2" should read -- $\frac{1}{5} L2$ --.

Signed and Sealed this
Second Day of December, 2025

John A. Squires
*Director of the United States Patent and Trademark Office*